United States Patent [19]

Holt

[11] Patent Number: 5,501,397
[45] Date of Patent: Mar. 26, 1996

[54] RECIRCULATING PAINT SYSTEM HAVING A VALVED QUICK DISCONNECT FLUID COUPLING ASSEMBLY

[75] Inventor: Earl R. Holt, Rochester, Mich.

[73] Assignee: Hose Specialties/Capri, Inc., Highland Park, Mich.

[21] Appl. No.: 161,825

[22] Filed: Dec. 2, 1993

[51] Int. Cl.[6] ........................ F16L 37/28; B05B 9/00
[52] U.S. Cl. .................... 239/124; 239/588; 239/600; 251/149.6
[58] Field of Search ..................... 239/124, 127, 239/569, 583, 588, 600; 251/149.6, 149.7

[56] References Cited

U.S. PATENT DOCUMENTS

| | | | |
|---|---|---|---|
| 1,489,310 | 4/1924 | Critchlow | 251/149.6 |
| 2,807,502 | 9/1957 | Tharp | 239/588 |
| 3,104,088 | 9/1963 | Cator | 251/149.6 |
| 3,230,964 | 1/1966 | Debrotnic et al. | 251/149.6 |
| 3,538,950 | 11/1970 | Porteners | 251/149.6 |
| 3,720,373 | 3/1973 | Levey | 239/127 |
| 4,106,699 | 8/1978 | Holt | 239/124 |
| 4,114,853 | 9/1978 | Medvick | 251/149.6 |
| 4,442,003 | 4/1984 | Holt | 210/445 |
| 4,911,203 | 3/1990 | Garms | 251/149.6 |
| 5,060,861 | 10/1991 | Holt | 239/124 |
| 5,195,680 | 3/1993 | Holt | 239/124 |

FOREIGN PATENT DOCUMENTS

818818   8/1959   United Kingdom ................ 251/149.7

*Primary Examiner*—Karen B. Merritt
*Attorney, Agent, or Firm*—Harness, Dickey & Pierce

[57] ABSTRACT

A recirculating paint supply system supplies single or multiple paint coatings to paint spray stations arranged in parallel or series relation, each station including manually operated flexible monoline and coaxial conduits to supply paint to a spray gun. In one aspect of the invention, the fluid connectors inhibit paint build up which might otherwise contaminate the paint line and include a unique quick disconnect ball valve to inhibit paint splash back, a ball valve having a unique seal for the ball, a compression seal arrangement in a flow enabling/disabling H-connector, a Y-shaped connector to mix two paint coatings, and a Y-shaped connector to interconnect the supply and recirculating lines to rows of spray stations. In another aspect, unexpected benefits are found from the selective use of glass-filled nylon and stainless steel components in the fluid connectors.

14 Claims, 10 Drawing Sheets

RECIRCULATING PAINT SYSTEM HAVING A VALVED QUICK DISCONNECT FLUID COUPLING ASSEMBLY

BACKGROUND OF THE INVENTION

This invention relates to a paint system including a flexible conduit or hose arrangement to supply a liquid coating composition from a paint supply system to a spray gun. More particularly, this invention relates to fluid connectors for the paint system.

As those familiar with the prior art will appreciate, in previous paint supply systems, a base coat of paint is applied at a first station and then the article, such as an automobile body, is conveyed to a new station where a clear coat paint is applied, the clear coat paint adding the feeling of depth to the paint. The ability to apply a clear coat and a base coat at the same time would provide a dramatic reduction in the cost of painting the car in the sense that half of the spray booths could be eliminated or deactivated and therefore half of the equipment and half of the manpower could be eliminated from the painting operation.

Additionally, the modern factory is typically spread out and paint booths are not localized in one area or arranged so as to be parallel to one another. As a result, the use of a series connection between paint booths requires extensive tubing, particularly when the paint must be supplied to opposite sides of each booth. Accordingly, it would be desirable to minimize the number of lines needed to supply paint in a paint system and the cost associated with these lines.

A continuing problem associated with the spray application of liquid paints is the presence of foreign particulate matter in the liquid paint supply which causes imperfections on the surfaces of the article being spray painted, frequently necessitating a refinishing or repainting thereof. Such foreign particulate matter, sometimes referred to as "seeds," or "strings, or" "snotters" are formed in many instances as a result of an agglomeration of the paint constituents during standing or recirculation of the liquid paint necessitating removal prior to discharge through the spray nozzle. The foregoing problem is particularly pronounced in recirculating type liquid paint systems, although they are present in direct line systems as well.

Recirculating paint supply systems conventionally comprise a mixing tank equipped with suitable agitation for maintaining the liquid coating composition uniformly mixed and a pump for transferring the liquid coating composition under a desired pressure to a manually manipulable supply conduit connected to the spray nozzle. A suitable return hose is provided for returning the excess quantity of paint back to the mixing tank for recirculation and to keep the paint in suspension. Typical of such a system is the recirculating paint supply system shown in U.S. Pat. No. 5,060,861, the specification of which is incorporated herein by reference. In this paint supply system, the supply and return hoses are interconnected by suitable fluid fittings so as to form a single conduit having coaxial passages for supplying and returning the liquid composition.

This and like paint systems typically will utilize many different fittings, connectors and coupling arrangements to complete the necessary fluid interconnections. Such fittings are often generally made of metal which can result in the conduit being relatively heavy. However, the paint supply hoses or unitized fluid conduit, and the associated fluid fittings, should be as light as possible to reduce operator fatigue and enable the operator to manipulate the position of the spray gun.

Seals and filters are also included in the paint supply line to seal the interconnections as well as to remove particulate matter from the paint being provided to the spray gun. In spite of the seals and filters, foreign matter can still be present. For example, the quick connectors used for the spray gun tend to create spit at the quick disconnect upon disconnecting which is generally not noticeable but, when dry, will cause leakage and contamination to occur. Further, to prevent leakage, it is known to cover the threaded sections of fluid fittings with pipe dope and then assemble the fittings. While this arrangement works well in many fluid sealing applications, it has several disadvantages. First, a pipe fitter must be called to assemble or disassemble the unit, which can be an inconvenience. Further, exposed threads create voids in the joint between the components which causes paint to accumulate and generates paint particles (dirt, etc.) that will be sent downstream and end up on the car, resulting in the need to rebuff and/or repaint the car.

Various flow control devices or paint restrictors are also used with paint supply systems. In many cases such prior art constructions have been handicapped by their tendency to become plugged over periods of use, necessitating frequent replacement and/or downtime to permit cleaning to restore them to proper operating conditions. The build up of deposits in such flow regulators cause a progressive decrease in the pressure of the liquid coating composition supplied to the spray nozzle, thereby resulting in variations in the quality and thickness of the coating, thus detracting from their use.

Moreover, a flow control device must include an element that moves relative to its valve body in order to change the flow rate. For example, a conventional ball valve has a rotatable ball member through which fluid can flow and seal portions positioned at the opposing upstream and downstream faces of the ball to inhibit flow therearound. Extended use of the valve member in one flow position can result in paint coagulating in voids formed around the seal portions. When the ball member is rotated, paint portions can break loose, thus detracting its use. Paint flakes, particles and dirt can result from the mating of fluid connector members, notwithstanding a seal being positioned to prevent flow around mated portions.

Accordingly, it would be desirable to limit or replace the use of threaded fittings with compression fittings, or those that use only pressure, thereby eliminating voids which tend to cause the paint to accumulate.

SUMMARY OF THE INVENTION

The benefits and advantages of the present invention are obtained in a recirculating paint supply system that has a substantially flexible recirculating fluid conduit connected at one end to a spray gun and at its other end to supply and return lines of a paint supply.

To selectively connect and disconnect the supply and return lines of the paint system to the supply and return hoses of the recirculating conduit, a series of ball valves are interconnected to form an H-shaped fluid connector assembly. According to an exemplary embodiment of this invention, a funnel shaped seal is sandwiched between mating frustoconical surfaces of the interconnected ends of the valves whereby to form a compression seal. Additionally, the interior surfaces of the valves which contact the paint composition are comprised of stainless steel. or other suitable metal, that is resistant to attack by the paint.

According to a preferred embodiment of the paint system of the present invention, the discharge end of the recirculating fluid conduit has a fluid fitting secured thereto. In an exemplary embodiment, helical convolutions having a predetermined pitch width extend radially outward from the fitting, and a guard for protecting the outer periphery of the conduit and providing strain relief to conduit is secured to the helical convolutions. The fluid fitting includes a rotatable coupling nut, and the guard includes a wire helically coiled to form a generally cylindrical member that encircles an axial portion of the conduit and extends axially away from the fitting. A portion of the wire helix has the same predetermined pitch width as and threadably engages the convolutions, coupling rotation of the nut tending to tighten the engagement of the coil with the convolutions.

According to another preferred embodiment of the paint system of the present invention, particularly applicable for the manual spray application of liquid coating compositions, a quick disconnect connector assembly is provided to enable the rapid connection and disconnection of the fluid conduit and prevent unwanted spit of paint during the connection or disconnection to the spray gun. The quick disconnect connector assembly comprises a valve body having a bore, a tubular fluid conduit which is inserted into the bore, a seal element having a passage positioned in the bore, and a closure member normally engaged with the seal for sealing the passage and movable from sealed engagement by the inward insertion of the fluid conduit. The fluid conduit and the seal passage are dimensioned such that the forward end portion of the fluid conduit is adapted to establish sealing engagement with the wall of the seal passage both when the fluid conduit has been partially inserted into the passage but prior to engaging the closure member, during which time no flow is permitted through the connector assembly, and also when fully inserted into the passage, whereby to move the closure member from its flow preventing engagement with the seal.

According to another preferred embodiment, a flow control device of the present invention comprises a valve body having opposite end portions and a bore extending between the end portions, a closure member, including a rotatable ball member in the bore and having a passageway therethrough, for selectively opening and closing the bore to permit and prevent flow through the bore, and seal means, operating to encapsulate the ball member, for sealing the bore to prevent unwanted fluid leakage. The seal operates to eliminate voids in which paint could collect and break free to contaminate the paint system during rotation of the ball.

Further, certain of the connection elements provided in the flexible recirculating conduit are comprised of a suitably configured polymeric material which combines strength and functional relationships and decreases weight, the material preferably being of a glass-filled nylon. Importantly, the fluid connection elements connecting the supply to the inlet end of the conduit are comprised of stainless steel.

The present invention overcomes many of the problems and disadvantages associated with prior art constructions, providing simple, economical yet durable devices which can be directly connected to the fluid inlet of a conventional spray gun and is easily manipulable by an operator. Significantly, flakes and other particles which could interfere with the quality of the painted surface are inhibited and possibly eliminated.

Additional benefits and advantages of the present invention will become apparent upon a reading of the description of the preferred embodiments taken in conjunction with the accompanying drawings.

BRIEF DESCRIPTION OF THE DRAWINGS

FIG. 6 is an exploded view of an H-shaped fluid connector assembly for selectively connecting or disconnecting the supply system to the recirculating conduit according to this invention.

FIG. 13 shows the discharge end portion of the recirculating conduit.

DESCRIPTION OF THE PREFERRED EMBODIMENTS

Figure 1:
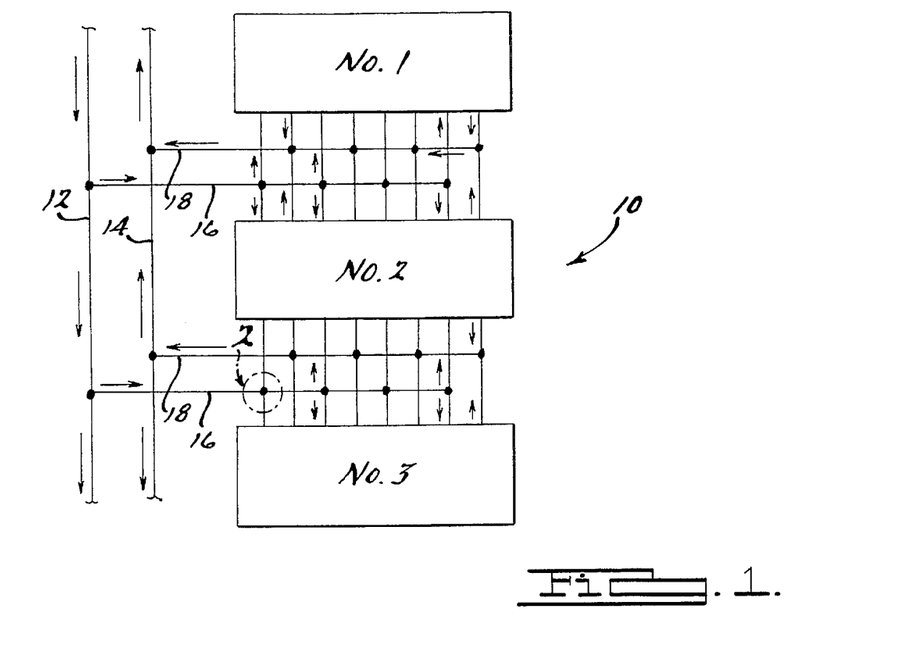
FIG. 1 is a schematic view of a multiple spray station arrangement of a recirculating liquid paint coating composition supply system embodying the invention.

Referring now to the drawings, and as may best be seen in FIG. 1, a multiple station recirculating liquid paint coating composition supply system 10 is illustrated. The supply system illustrated in FIG. 1 illustrates a paint system for recirculating a single paint of a specific color to each of the three spray stations identified at Numbers 1, 2 and 3. In the embodiment shown, each station is in communication with a pressurized liquid coating or paint supply header 12 and a low pressure paint return header 14. It will be appreciated that the spray stations illustrated in FIG. 1 can form a row of separate spray booths to provide for a plurality of different coating compositions and/or different colors. By way of example, each spray station may include twelve different systems to supply twelve different colors of the desired coating composition.

The paint supply system typically includes a supply tank and a supply pump for supplying the liquid coating paint composition under pressure to the supply header. The quantity of paint composition that is supplied but which is in excess of that required at the multiple stations is returned to the supply via the return header. A supply branch line 16 at each spray station is connected to the supply header 12 and in turn is connected to a shut off valve at the entry to the spray booth whereby to supply paint composition to a desired spray station. A return branch line 18 at each spray station is connected to the paint return header 14 and to a shut off valve at the exit from the spray station whereby to return paint composition via the return header to the supply tank.

According to an important feature of the foregoing arrangement, the spray stations can be connected in series and in parallel. That is, each of the plurality of branches permit selective branch lines to service a line of spray stations at different locations and each station to be provided with a plurality of outlets. Additionally, two branch lines can be used to service opposite sides of a common spray station.

Figure 2:
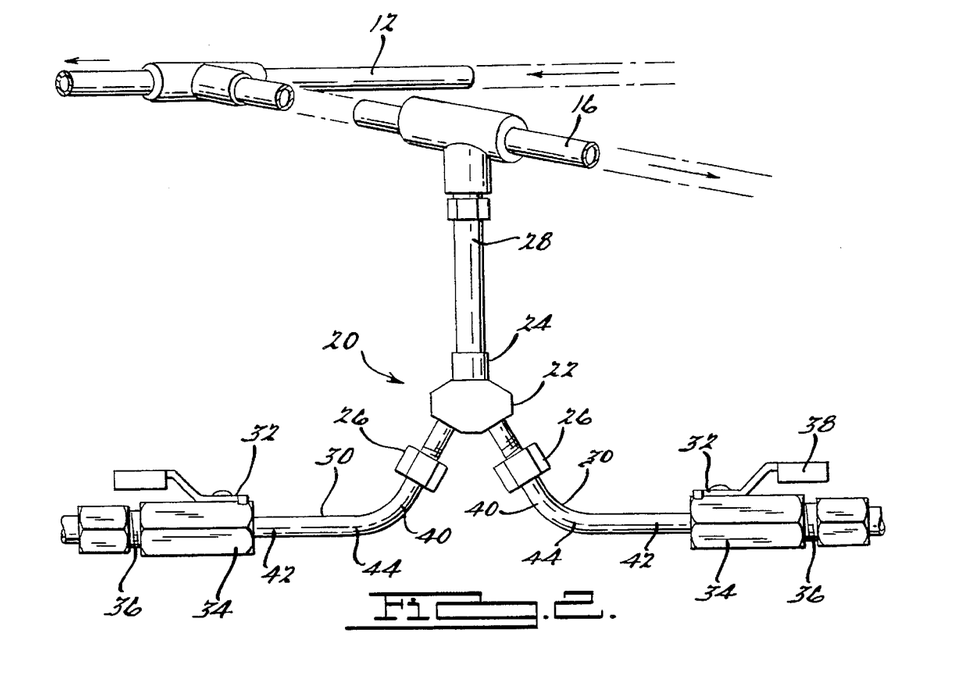
FIG. 2 is a view taken along line 2—2 of FIG. 1 illustrating a fluid connector assembly connecting a paint supply line to a pair of paint stations according to the invention.

As shown in FIG. 2, according to an important aspect of this invention, a specially configured fluid connector assembly 20 is provided to either supply or return the coating composition to each of two spray stations, such as to stations No. 2 and No. 3. As illustrated, a supply fluid connector assembly 20 comprises a Y-shaped fluid fitting 22 including an inlet port 24 and two outlet ports 26, a generally straight tubular fluid conduit 28 for connecting the inlet port 24 to the supply branch line 16, a pair of angled tubular conduits 30 each having an inlet end connected to one of the outlet ports 26 and an outlet end, and a pair of ball valves 32. The ball valve 32 has an inlet end 34 connected to the outlet end 42 of one of the angled tubular conduits, and an outlet end 36 connected to supply paint composition into the spray station. Each ball valve 32 can be closed to prevent fluid from passing into the spray station, at that location, or opened to permit fluid to pass into the station. When the fluid connector assembly 20 is used to return a paint composition, the outlet ports 26 would communicate the composition from the stations to the fluid fitting 22 and via the fluid conduit 28 into the paint return header 14.

Preferably, the angled tubular conduits 30 have first and second portions 40 and 42 with the first portions 40 extending along a first axis that is generally at an obtuse angle to the fluid conduit 28 and the second portions 42 extending along a second axis that is generally orthogonal (i.e., perpendicular to) to the fluid conduit 28. Generally, the first and second portions are joined by a curved portion 44 and are disposed at an angle of about 130°–140°, and preferably at about 135° to one another. When connected to the fluid fitting, the fluid conduits 28 and 30 form a generally Y-shaped configuration. While a T-section is known for the purposes of dividing and/or directing a fluid to and along a path that is generally orthogonal to the supply, it is believed that the 90° change in direction is too abrupt in a paint system and can lead to problems. The Y-shaped configuration of FIG. 2 is believed to enhance constancy of volume flow without paint coagulation and obviate any possible adverse effects that may otherwise interfere with the uniformity of paint flow. While not shown, the Y-shaped fluid connector assembly 20 could be used to return the low pressure paint composition to the return header.

Figure 3:
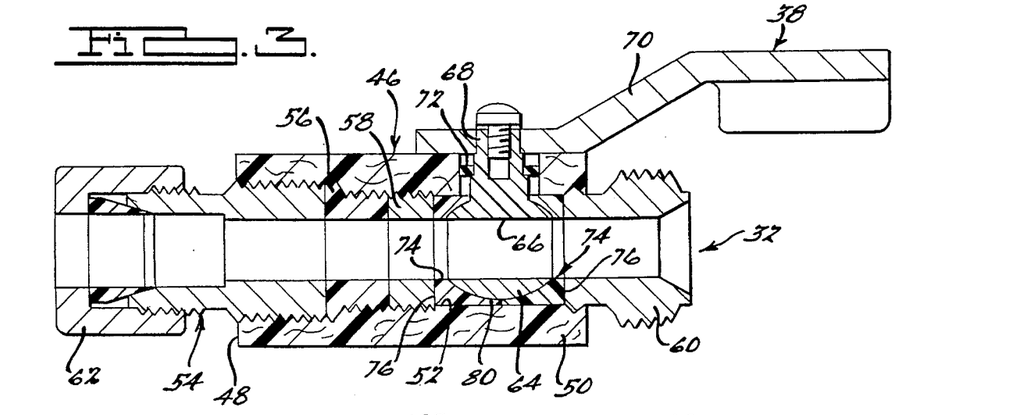
FIG. 3 is a section view of a ball valve fluid connector including a seal arrangement according to this invention.
Figure 4:
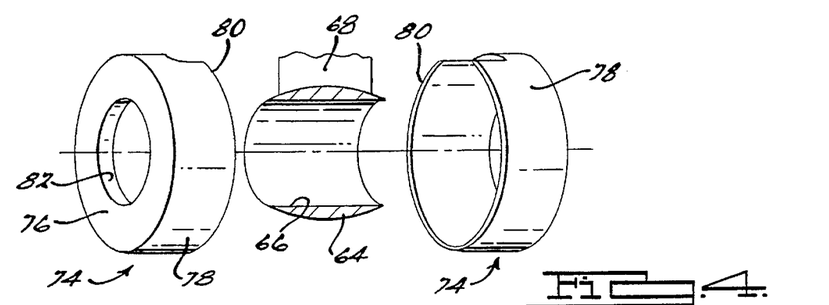
FIG. 4 is an exploded view, in section, of the seal arrangement shown in FIG. 3.

As shown in FIGS. 3 and 4, the ball valve 32 includes a valve body 46 having opposite axial end faces 48 and 50, and a selectively threaded bore 52 extending between its end faces. The following elements are arranged in the bore in the following sequence: a first end fitting 54 adjacent to the end face 48, a Teflon spacer 56, a stainless steel retainer member 58, the spacer and the retainer being threadably connected to the bore, the fluid sealed flow regulator member 38, and a second end fitting 60 adjacent to the end face 50. The first end fitting 54 includes a first portion that is threadably engaged with the bore and a second portion extending outwardly of the bore, the second end portion including a coupling nut 62 for connecting the ball valve 32 to stainless steel tubing. The second end fitting 60 includes a first portion threadably engaged with the bore and an externally threaded second portion extending from the bore.

The fluid sealed flow regulator member 38 includes a spherical ball 64 rotatably positioned in the bore of the valve body and having a passage 66 extending therethrough, an operating rod 68 extending from the ball and through the valve body, and a handle 70 connected to the operating stem for rotating the ball in the bore whereby to position the passage 66 relative to the bore. An O-ring 72 is provided to seal around the rod 68 where it passes through the valve body.

According to this invention, the valve body 46 is comprised of a polymeric material, such as glass filled nylon. Preferably, the externally threaded first portions of the end fittings are embedded in the polymeric material. Further, except for the elements that must be resilient to complete a seal, it is contemplated that the end fittings, the retainer member and the ball that makes contact with the paint composition be comprised of stainless steel, or other suitable material having a resistance to attack by the paint. It is believed that when the paint is subject to metal contact, paint flakes/particles are inhibited in the paint system downstream of the supply and return.

Importantly, a combination bearing and seal arrangement is provided whereby to seal the ball 64 relative to the bore. Although the use of seals which engage the ball element are known, leakage and paint flakes has oftentimes been a problem.

According to this invention, a pair of cylindrical cup-shaped valve seats 74 are adapted to be brought into abutting relation with one another and encapsulate the rotatable spherical ball 64 therebetween. Each valve seat 74 has a flat endwall 76 to sealingly abut the retainer member 58 or the second end fitting 60, depending on whether the valve seat is upstream or downstream of the ball, and a generally cylindrical wall 78 having an axial mating face 80 and forming a semispherical cavity. The mating faces are axially abutted to form an axial seal without introducing any voids. The outer periphery of the cylindrical wall 78 is adapted to engage the bore to form a seal therewith. The endwall 76 has an opening 82 to pass fluid between the valve seats when ball is positioned so that fluid will pass through its passage 66.

In operation, the valve seats 74 are placed on opposite sides of the ball 64 and axially pressed together, whereby the mating faces 80 are abutted to form a substantially void free axial seal, and the cylindrical walls 78 form a cavity to totally encapsulate the ball 64. This bearing cavity completely encapsulates the ball so that no paint can accumulate in the interface between the ball and the polymeric body of the valve, which material would, when dried, lead to the possibility of paint flakes/particles breaking free during rotation of the ball 64. There are no crevices or threads to collect paint or dirt where it can harden and contaminate later paint jobs.

Figure 5:
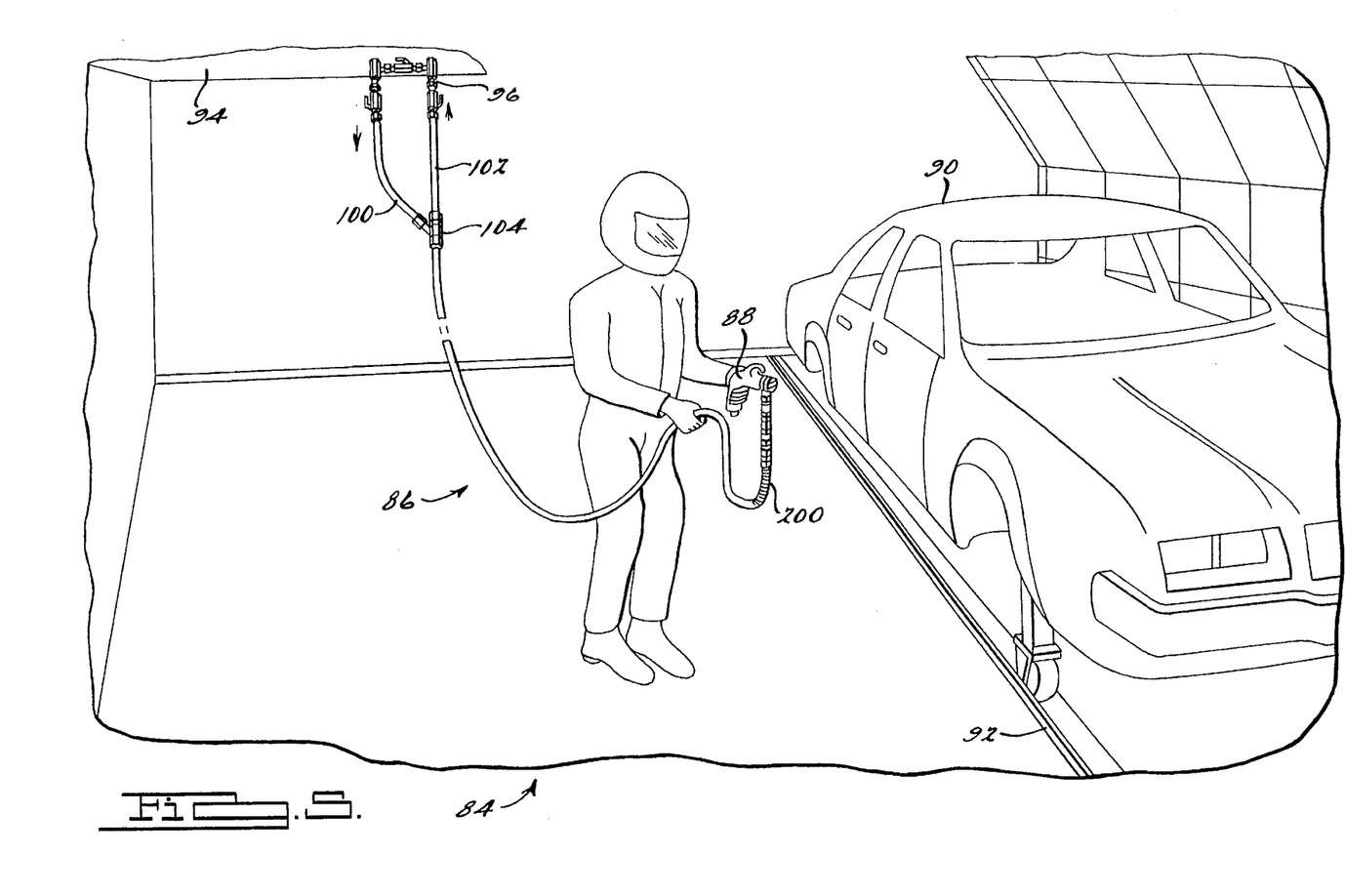
FIG. 5 is a perspective view of an individual spray station and incorporating a coaxial recirculating conduit for supplying and returning excess liquid paint coating composition to the supply system embodying the invention.

FIG. 5 is a perspective view, embodying the invention, of an individual spray booth 84 in one of the paint stations and a recirculating conduit 86 used by an operator to direct the liquid paint coating composition from the supply system to a spray gun 88. It is to be understood that the spray booth is not exclusively limited to the supply system and paint station arrangement disclosed.

As shown, a product to be painted such as an automotive vehicle 90, is moved through the spray booth by a conveyor system 92. The walls of the spray booth are formed from rectangularly shaped pads of removable plastic film so that walls may be cleaned by simply removing the layers of film.

In the embodiment shown, the supply and return lines from the Y-shaped fluid connector assembly 20 enter the spray booth through the ceiling 94 and into an H-shaped connector assembly 96. Of course, the supply and return could enter in a manner other than that shown (e.g., the lines could enter through a wall of the station). The recirculating conduit has one end thereof connected to the supply and return lines of the paint system via the H-shaped connector and its other end connected to the spray gun 88.

According to an important feature of this invention, the components of the spray gun 88 are preferably comprised of a polymeric material whereby to contribute to an overall decrease in the weight of the conduit handled by the operator. Preferably, the polymeric material would be glass filled nylon. However, the spray gun could be comprised of metal.

According to this invention, as shown in FIG. 6, the H-shaped fluid connector assembly 96 is provided for selectively connecting the supply and return branch lines 16 and 18 of the paint supply to the inlet and return ends of the recirculating conduit 86 or interrupting the supply of paint to the recirculating conduit whereby the recirculating conduit 86 may be disconnected for service, cleaning or the like. The H-shaped fluid connector assembly is formed by valves 96b and 96c each having an internal construction as described above for the ball valve 32. Valves 96a are of the bulkhead type and each has an externally threaded sleeve portion 96e at one of its ends for completing a fluid connection, respectively, to the supply and return headers 12 and 14 of the paint system, an internally threaded bore at the other of its ends to threadably receive the threaded end portion of a fluid coupler 96d, and a side branch 96f fitted with a rotatable fluid coupler 96d. The valves 96b and 96c are the same and each has an externally threaded sleeve portion 96g and 96h at its opposite ends. The bypass valve 96b has its opposite sleeve portions 96g and 96h threadably engaged, respectively, with the respective fluid couplers 96d in the side branches of the valves 96a. Each valve 96c has one of its sleeve portions 96g threadably connected with a fluid coupler 96d of a respective valve 96a and the other of its sleeve portions 96h threadably connected to the respective supply and return lines of the recirculating conduit 86, in a manner to be described.

In operation, when the valves 96c are open and the bypass valve 96b is closed, fluid may flow to and from the paint supply and into the recirculating conduit whereby to communicate to the spray gun 88. If however the valves 96c are closed and 96b is open, fluid cannot pass into the recirculating conduit 86 whereby the recirculating conduit may be replaced, or removed, if desired.

According to this invention, a hollow funnel-shaped seal member 98 is located between mating conical surfaces formed in the sleeve portion of the valves 96a, 96b or 96c and in the fluid coupler 96d and axially compressed into fluid sealed relation. Preferably, the seal member 98 is comprised of Teflon and includes a cylindrical portion at one end and a conical portion at the other end. The sleeve portion includes an inwardly tapering conical wall and an interior cylindrical wall whereby to form a recess sized to nestingly receive the seal member 98. Coupling rotation of the fluid coupler 96d desirably results in a compression fluid seal between the mating members.

Figure 7:
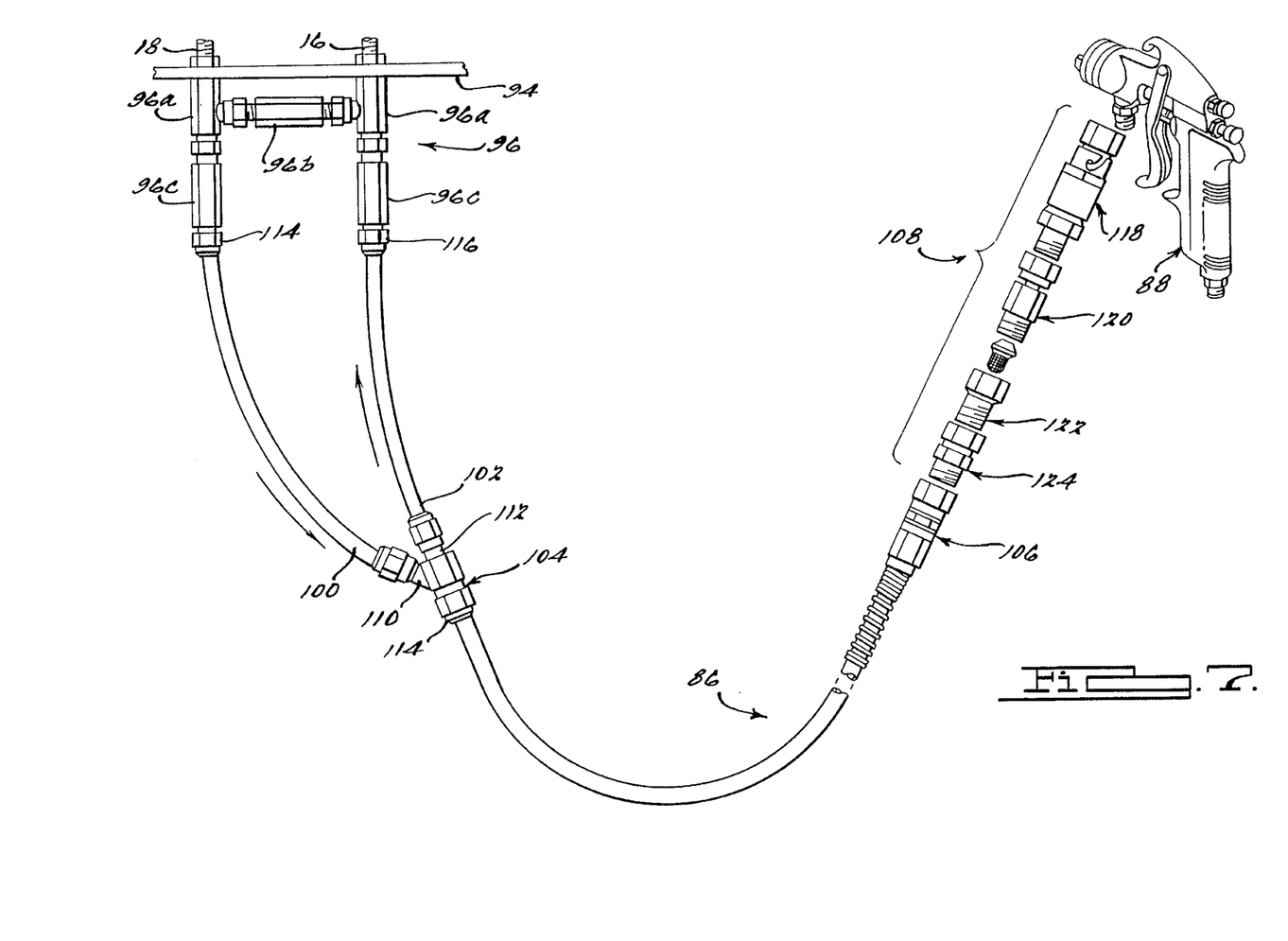
FIG. 7 is a partly exploded schematic view of the recirculating conduit shown in FIG. 3 and the fluid connectors therefor.

FIG. 7 is a partly exploded schematic view of the recirculating conduit 86 used in the paint supply system, including a pressurized paint supply line for supplying paint to the nozzle of the spray gun 88 in a quantity in excess of that required and a return line for recirculating excess paint from the spray gun. The recirculating conduit comprises a pair of hoses 100 and 102 arranged coaxially and including an outer hose 100 which forms a supply conduit, an inner hose 102 which forms a return conduit, a Y-shaped coupling 104 attached to the hoses to direct fluid into the passage formed between the hoses 100 and 102, and a fluid fitting 106 secured to the discharge end of the outer hose 100. The coupling 104 includes an inlet end 110 connected in fluid tight relation to the supply branch line 16 via the H-shaped connector assembly 96, a return end 112 connected in fluid tight relation to the return branch line 18 via the H-shaped connector assembly, and an outlet end 114. The fluid fitting 106 is adapted to connect the discharge end of the recirculating conduit 86 with a fluid fitting assembly 108 for connection to the spray gun 88.

The recirculating conduit 86 and the Y-shaped coupling 104 are similar to those disclosed in the aforementioned U.S. Pat. No. 5,195,680. Generally, the outer hose 100 is of a composite construction to include outer and inner layers, the outer layer being comprised of a material having high strength and flexibility. A suitably material is a mixture of nylon and polyurethane plastics. The inner layer and the inner hose 102 are comprised of a material which is resistant to attack by the liquid coating compositions in contact therewith, nylon being one suitable material.

The fluid fitting assembly 108 between the spray gun 88 and the fluid fitting 106 at the discharge end of the recirculating conduit comprises, in the following sequence, a quick disconnect fluid coupling assembly 118 which is adapted to be attached to the spray gun, a swivel fluid connector 120, a filter fluid connector 122, and a flow control or restrictor fluid connector 124 which is adapted to be coupled to the fluid fitting 106. According to a particular feature of this invention, it is important that the fluid fittings withstand attack of the liquid coatings in contact therewith yet be sufficiently light in weight such that total weight of the spray gun, fittings and hose which must be held and maneuvered manually be held to a minimum. According to this invention, this objective is achieved by selective manufacture of the fitting elements of a polymeric material. As will be discussed further hereinbelow, the quick disconnect, the swivel, the filter, the restrictor, and the fluid discharge connector at the end of the hose are selectively comprised of a polymeric material such as glass filled nylon.

Figure 8:
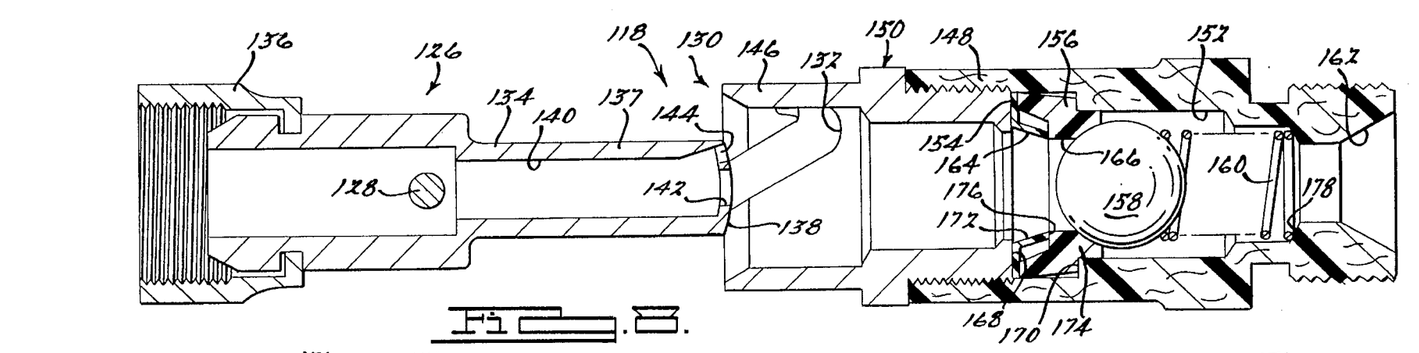
FIG. 8 is an exploded assembly view, in section, of a quick disconnect fluid connector assembly according to this invention.
Figure 9A:
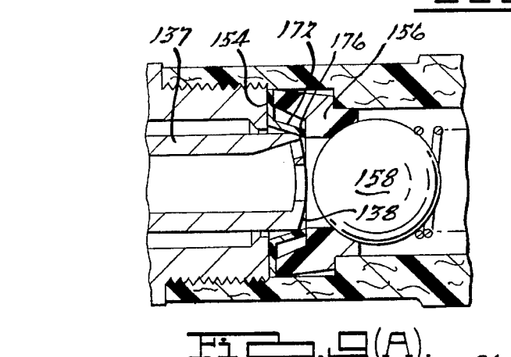
FIGS. 9(A), 9(B) and 9(C) are side views in section showing the quick disconnect fluid connector assembly of FIG. 8 being connected.
Figure 9B:
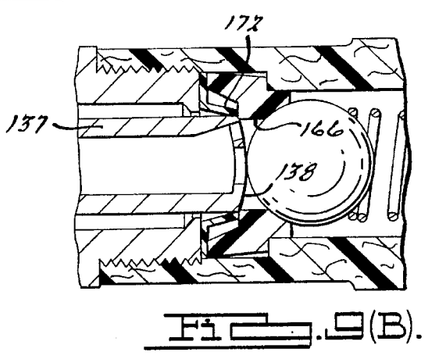
Figure 9C:
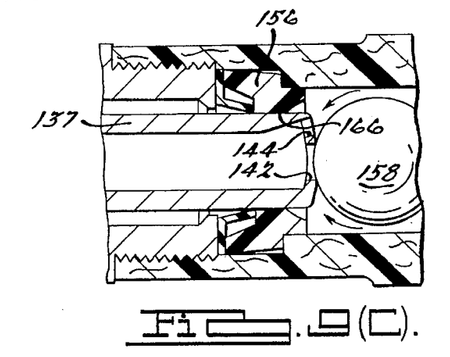

As shown best in connection with FIG. 8 and in the coupling sequence illustrated FIGS. 9(A) to 9(C), the quick disconnect fluid coupling assembly 118 includes a centrally bored valve member 126 having a pin 128 extending radially therefrom, and a centrally bored ball valve 130 having a bayonet slot 132 at its forward mating end to interengage with the radial pin to couple the two together. The valve member 126 includes an elongated cylindrical stem 134 having an internally threaded coupling nut 136 rotatably mounted thereto for connection to a threaded end of the spray gun 88 and an axial forward end portion 137 adapted to be inserted into the valve member. The stem 134 has an axial end face 138 which protrudes axially forward of the stem body and a central bore 140 therethrough for passing fluid. The end face 138 is slightly semispherical in shape and is provided with a central aperture 142 and one or more peripherally disposed apertures 144, each aperture communicating with the central bore 140.

The ball valve 130 includes forward and rearward shell portions 146 and 148 which are threadably engaged to form a valve body 150 having a generally cylindrical stepped bore 152 extending centrally between the forward and rearward ends of the body, a pair of seal members 154 and 156 disposed in the bore to seal about the outer periphery of the stem 134 and the bore 152 of the valve body 150, and a closure member in the form of a spherical ball 158 normally biased by a coil spring 160 into engagement with the seal member 156 to prevent fluid from passing through the bore. The forward end of the shell portion 146 forms a cylindrical socket to receive the stem 134 and includes the bayonet slot 132 to engage with the pin 128 during axial insertion of the stem into the valve body. The rearward end of the shell portion 148 includes a conical socket 162 for compression mating with a corresponding conical face on the swivel fluid connector 120.

Preferably, the shell portion 146 is comprised of a metal, such as stainless steel, whereby to endure the forces and wear occasioned during connection and disconnection to the stem 134. To reduce the weight of the conduit system, the shell portion 148 is formed of glass-filled nylon, or other suitable polymeric material not subject to attack by the paint material.

The seal members 154 and 156 are generally planar, circular and have a pair of flat faces, an outer circumference, and a central passage 164 and 166 extending between its respective faces. The seal members 154 and 156 are mounted in the bore 152 in sandwiched relation between the shoulders 168 and 170 formed on the shell portions 146 and 148. The outer diameter of each seal member 154 and 156 is preferably slightly greater than the inner diameter of the bore 152 whereby to provide an interference fit therebetween. When the shell portions 146 and 148 are brought together to assemble the valve body, the seal members 154 and 156 are compressed together to form an axial seal therebetween and a radial seal with the bore 152 of the valve body 150.

Preferably, the confronting faces of the seal members 154 and 156 are formed to include a conical skirt. As shown, the seal member 154 includes a conical skirt 172 which tapers inwardly and into encircling engagement about the entrance to the central passage 166 through the seal member 156. The seal member 156 includes a conical skirt 174 which expands outwardly and into sealing engagement with the inner wall of the bore 152 to complete a 360° sealing engagement therewith. The forward end 176 of the skirt 172 defines a restricted opening of the seal passage that is dimensioned to engage the outer periphery of the stem 134 prior to insertion of the stem into the passage 166 of the seal member 156. During insertion, the forward end 176 centers the stem 134 relative to the passage 166 and is forced against the seal member 156, thus to inhibit any flashback of the high pressure paint.

The closure member 158 is a spherical ball which seats, in part, in the entry to the central passage 166 and against the end face of the seal member 156. The coil spring 160 has its opposite ends disposed against a shoulder 178 of the valve bore and the closure ball 158 whereby to normally axially force the ball into the central passage, thereby compressing the seal material around the passage and forming a fluid seal thereabout.

The central passages 164 and 166 formed by the conical skirt 172 of the seal member 154 or by the wall of the passage through the seal member 156 has a diameter that is slightly less than the outer cross-sectional diameter of the stem 134 whereby to provide a sealed interference fit therebetween upon coupling engagement. Importantly, the stem will engage and seal with the central passages 164 and 166 prior to engaging the closure member.

During coupling, the stem 134 is axially inserted into the front mating end of the valve body 150 and the pin 128 engaged with the slot 132 in the socket thereof, twisted, and progressively inserted. The forward end portion 137 of the stem 134, when inserted, will be successively engaged with the seal members 154 and 156 to seal against leakage, during which time the closure ball 158 is forced against the seal member 156 to prevent fluid passage. Ultimately, upon complete interengagement between the pin 128 and the slot 132, the end face 138 of the stem 134 will engage and axially force the closure ball 158 away from fluid preventing closing relation with the seal member 156.

In FIG. 9(A), the forward end portion 137 of the stem 134 has been axially inserted into the bore 152 by an amount sufficient to engage the conical skirt 172 of the seal member 154, whereby to be in sealing engagement therewith, and to force the forward end 176 of the skirt against the seal member 156. The penetration of the stem 134 is such that a fluid seal is formed therebetween but the stem does not engage with the closure ball 158, which remains biased against and in sealing relation against the rearward end face of the seal member 156.

In FIG. 9(B), the forward end portion of the stem 134 has been inserted into the bore 152 by an amount sufficient to penetrate into the central passage 166 of the seal member 156. The outer periphery of the stem establishes sealing engagement with the seal member 156, without disturbing the sealing engagement between the closure ball 158 and end face of the seal member 156. The stem is also in sealed engagement with the conical skirt 172.

In FIG. 9(C), the axial end face 138 of the stem 134 has reached and driven the closure ball 158 axially rearward from its engagement with the end face of the seal member 156 whereby fluid is permitted to pass through the valve body 150, through the apertures 144 in the end face 138, and through the central bore 140 of the stem 134. The closure ball 158 would then be seated in the central aperture 142 formed in the axial end face 138. Importantly, during withdrawal, the controlled sealing engagement between the stem 134 and the seal members 154 and 156 allows gradual reseating of the closure ball 158 against the end face of the seal member 156 and into the central passage 166 whereby to inhibit paint from splashing outwardly.

Figure 10:
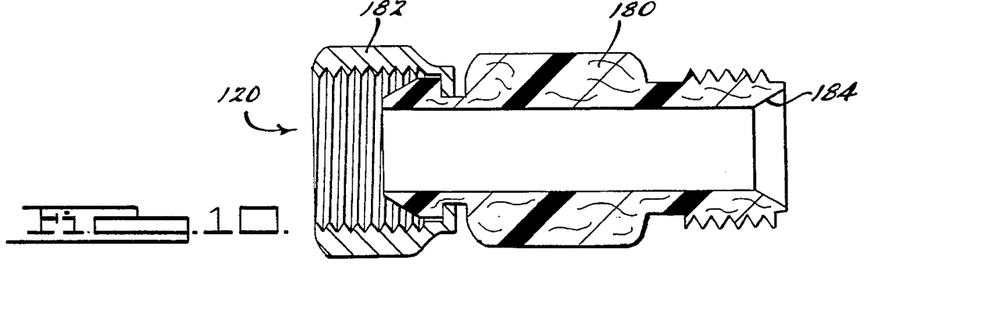
FIG. 10 is a section view of a swivel fluid connector.
Figures 11, 12:
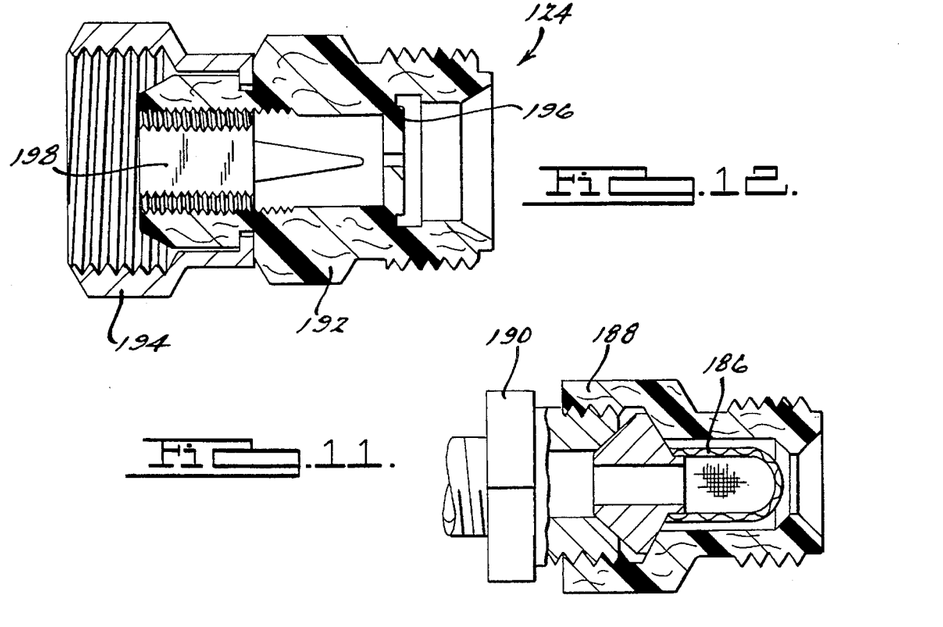
FIG. 11 is a section view of a filter fluid connector assembly.
FIG. 12 is a section view of a restrictor fluid connector.
Figure 12:
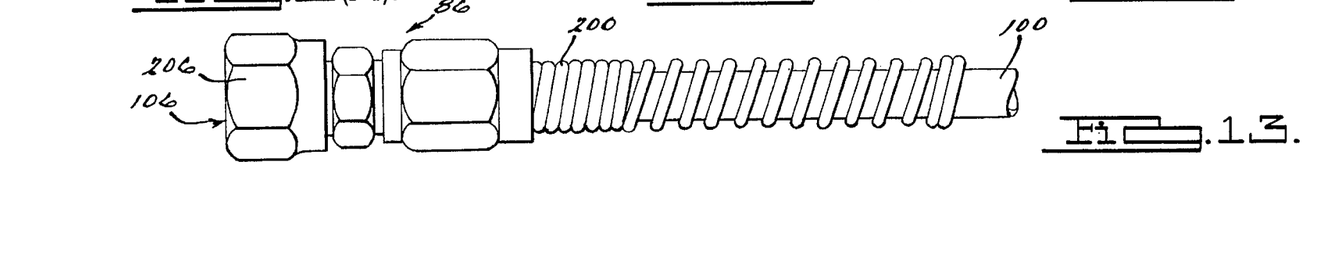

FIGS. 10, 11 and 12 disclose, respectively, details of the swivel fluid connector, the filter fluid connector and the restrictor valve. The swivel fluid connector 120 includes a body 180 having a bore extending between forward and rearward portions thereof, and a rotatable coupling nut 182 on the forward portion to couple to the quick disconnect fluid coupling assembly 118. The rearward portion is externally threaded and has an internal conical wall 184 to form a portion of a compression connection when connected to the filter fluid connector 122. Preferably, the body 180 is comprised of a suitable polymeric material, such as glass filled nylon. Desirably, the swivel fluid connector 120 allows the recirculating conduit 86 to rotate relative to the spray gun 88 and prevent forces from distorting the integrity of the recirculating conduit. Depending on the application, the coupling nut 182 may either be of a polymeric material, or metal, such as stainless steel.

The filter fluid connector 122 is similar to that disclosed in U.S. Pat. No. 4,442,003, the teachings of which are incorporated herein by reference. Generally, the filter fluid connector 122 includes a thimble-shaped filter element 186 which is captivated between first and second ferrules 188 and 190, the first ferrule 188 being externally threaded for attachment to the restrictor fluid connector 124 and the filter element being affixed to the second ferrule 190. Importantly, however, the ferrule 188 is comprised of glass filled nylon and the ferrule 190 is comprised of stainless steel.

The restrictor fluid connector 124 is similar to that disclosed in U.S. Pat. No. 4,106,699, the teachings of which are incorporated herein by reference, and also in the aforementioned U.S. Pat. No. 5,060,861. The restrictor fluid connector 124 includes a centrally bored fluid housing 192, a coupling nut 194 mounted to the forward end portion of the housing for attachment to the ferrule 190 of the filter fluid connector 122, and a flow plate 196 and adjustable flow restrictor 198 secured in the bore of the fluid housing 192. Importantly, however, the fluid housing 192 is comprised of glass filled nylon.

Figure 14:
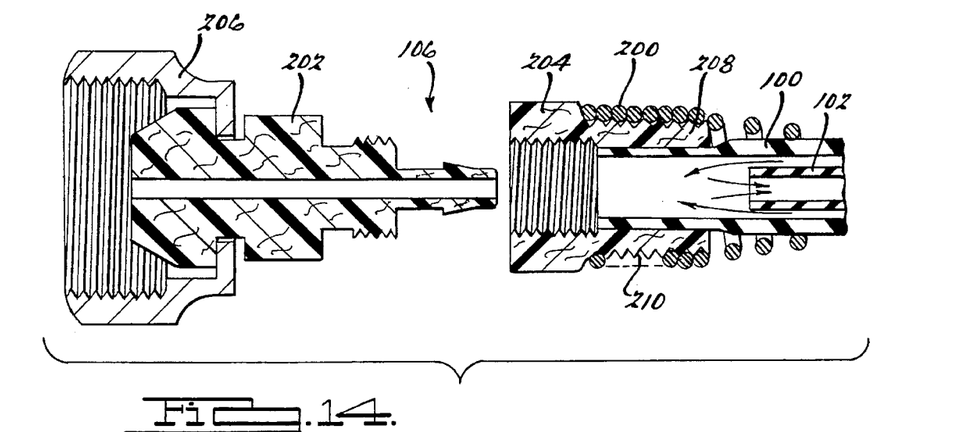
FIG. 14 is a partially exploded section view of the discharge end portion shown in FIG. 13 and illustrates a fluid connector that is terminated to the conduit and a spring guard that is secured to the fluid connector for supporting the conduit and the termination therefor according to this invention.

Turning to FIGS. 13 and 14, according to an important feature of this invention, the discharge end of the recirculating conduit 86 includes a flexible strain relieved termination, including the fluid fitting 106 that is terminated to the outer hose 100 of the recirculating conduit, and a helical coil sheath 200 to engage the fluid fitting and supportingly encircle the outer periphery of the recirculating conduit. Preferably, the fluid fitting 106 comprises a pair of fluid housings 202 and 204 which are threadably engaged to form the fitting. The fluid housing 202 includes a forward end portion onto which is mounted an internally threaded coupling nut 206 to connect to the restrictor fluid connector 124 and an externally threaded rearward end portion to threadably connect to the fluid housing 204. The fluid housing 204 includes a rearward end portion 208 to which the outer and inner supply and return hoses 100 and 102 of the recirculating conduit 86 are secured. Preferably the fluid housings 202 and 204 are comprised of glass filled nylon.

According to this invention, the rearward end portion 208 of the fluid housing 204 is externally threaded or formed to include helical convolutions 210 that extend radially outward therefrom with the sense of the convolutions (or thread) being opposite to the helical sense of the internal thread formed in the coupling nut 206. Further, according to this invention, the coil sheath 200 is formed by a wire that is helically coiled into an axially elongated cylinder and the helically coiled wire is threadably engaged within the grooves of the convolutions 210 formed on the fluid housing. As configured, coupling rotation of the coupling nut 206 on the fluid fitting 106 tends to tighten the threaded connection between the coils of the sheath and the helical grooves formed by the external thread.

Further, according to this invention, the forward end of the fluid fitting 106, enclosed by the coupling nut 206, is generally conically shaped. As such, the mated relation results in a compression fit.

Figure 15:
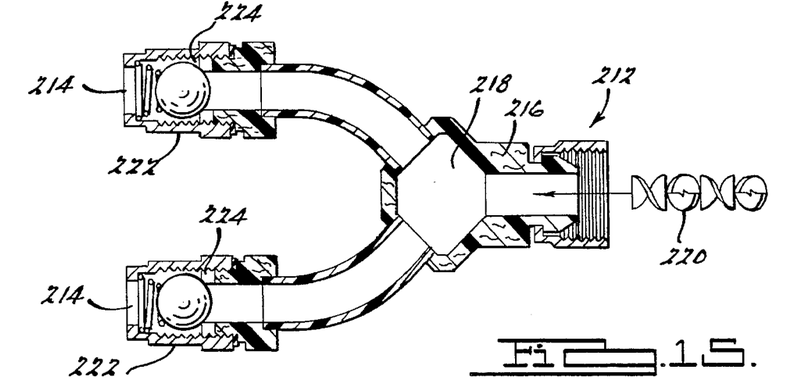
FIG. 15 is a section view of a Y-shaped fluid coupler for mixing two coating compositions according to this invention.
Figures 16, 17:
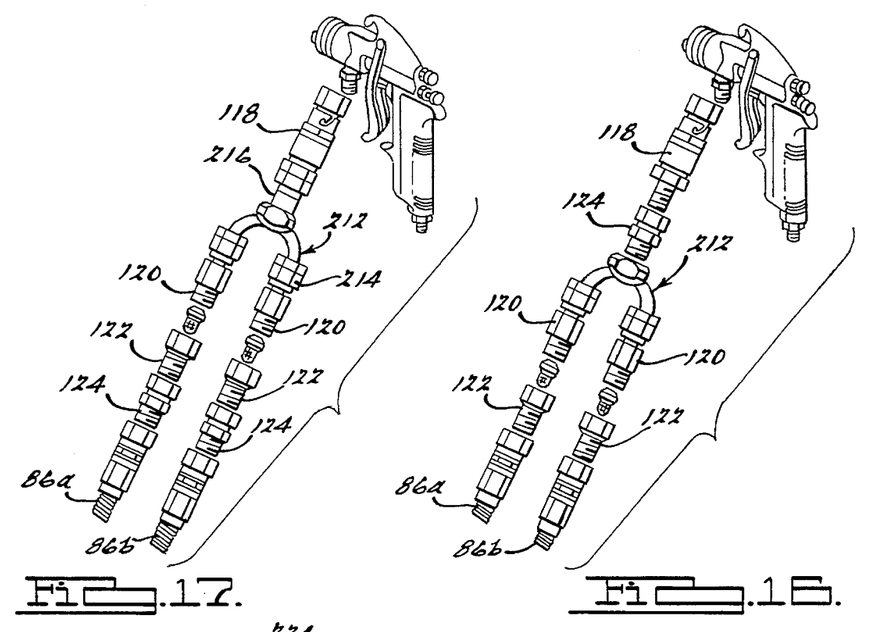
FIG. 16 illustrates another preferred embodiment of a recirculating paint supply conduit according to this invention, the conduit being particularly useful for mixing two paint coating compositions.
FIG. 17 illustrates another preferred embodiment of a recirculating paint supply system according to this invention, the conduit being particularly useful for mixing two paint coating compositions.

FIGS. 15–17 illustrate preferred embodiments of a paint system according to this invention in which two paint coatings are applied at the same time. According to these embodiments a pair of respective coaxial recirculating conduits 86a and 86b are connected, respectively, at their supply end to a paint coating source to supply same under pressure to the discharge end of the conduit. For example, the first recirculating conduit 86a could recirculate a clear coat paint and the second recirculating conduit 86b could recirculate a base paint. A unique Y-shaped fluid connector 212 operates to receive the flow of paint composition from each of the two recirculating conduits, mix the flows into one, and supply this mixed flow to the spray gun 88.

Referring to FIG. 15, the Y-shaped fluid connector 212 includes two inlets 214, an outlet 216, a central chamber 218 for receiving the two coatings from the inlets 214, and a nylon mixing element 220 in the chamber for mixing the two coatings. A check valve 222 is positioned at each inlet to allow the base coat or clear coat to flow from the inlet to the outlet but not to flow into to other inlet. A slot 224 in the check valve 222 permits fluid to flow through the check valve when the fluid is being discharged from the recirculating conduit. The nylon mixing element 220 comprises a generally axial fin formed (i.e., twisted) helically about its axis. The fin rotates about its axis to mix the paints together as the clear coat and base coat are received in the chamber.

The recirculating conduits 86a and 86b preferably include a restrictor fluid connector 124, as described above. As shown in the paint system of FIG. 16, a single restrictor connector 124 is positioned at the outlet (i.e. discharge) end of the Y-shaped connector 212 whereby to restrict the flow of paint to the spray gun. Alternatively, as shown in the paint system of FIG. 17, two restrictor connectors 124 are provided, one for each inlet to the Y-shaped connector 212. The restrictor fluid connector 124 would advantageously permit the user to vary the amount of either paint composition being supplied to the mixer.

It is believed that the fluid connectors, which connect the paint supply to the conduits, need to have their inner components of stainless steel, although the outer shell still may be made of glass-filled nylon or metal. It is believed that making the components from stainless steel results in less degradation of the paint of those surfaces that contact the paint. Although not shown, it is to be understood that in certain applications the coaxial recirculating (i.e., the hose within a hose) conduit described above could be replaced with four separate conduits.

Referring now to FIGS. 18–23, according to another important feature of this invention, a paint flow regulator 226 for use in recirculating liquid coating composition systems is adapted to provide a specific flow of a single coating material to the spray gun 88. The flow regulator 226 assures a continuous supply of a uniform liquid coating to the nozzle of the spray gun 88 at an adjustable desired pressure.

Figure 18:
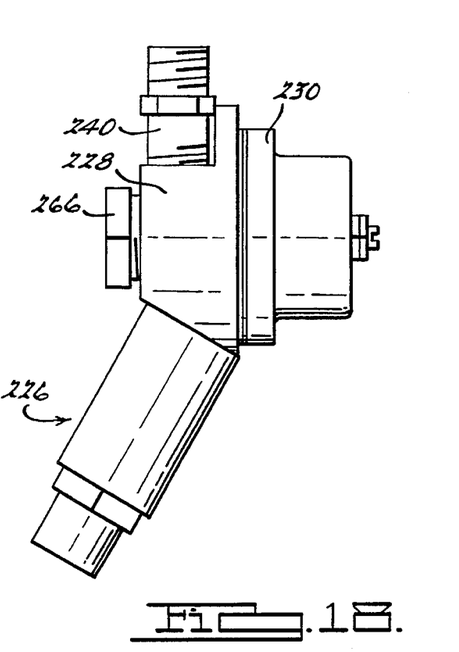
FIGS. 18–23 are views of a fluid flow regulator adapted to be connected to a recirculating paint system according to this invention.
Figure 19:
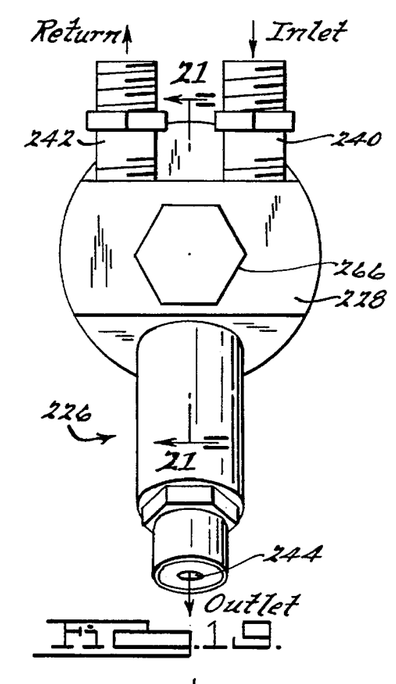

The flow regulator 226 includes a first and second housing 228 and 230 having respective mating faces 232 and 234 and forming respective chambers 236 and 238, inlet and return lines 240 and 242 communicating with the chamber 236 formed in the housing 228, an outlet line 244 communicating with the mating face 232, a fluid passage 246 extending between the flow chamber 236 and the mating face 232, and a diaphragm 248 and a gasket 250, the housings being combinable whereby the outer periphery of the diaphragm 248 and the gasket 250 are compressed between the mating faces 232 and 234 and the diaphragm isolates the chambers 236 and 238 from one another. A series of fluid recesses 252 arranged into the shape of a crucifix are formed in the front mating face 232 with one fluid recess 252 thereof being in direct fluid communication with the outlet line 244. The crucifix has its center located on the passage 246 and the respective recesses extend radially outwardly from the axis of the passage. The inlet and return lines 240 and 242 terminate in a conventional fluid connector and the outlet line 244 terminates in a conventional quick connect fluid connector.

Flow is regulated, in part, by an elastomeric seal 254 having a through bore 256 and mounted in the flow chamber 236 for sealing the entrance to the passage 246 and an axial push rod 258 mounted for axial movement in the bore 256 and in the passage 246. The push rod 258 has a shaped head 260 disposed in the flow chamber 236 and movable into sealing engagement with the wall of the through bore 256, a drive shoulder 262 positionable in the passage adjacent to the mating face 232, and a threaded forward end 264 extending through the diaphragm 248 and into the chamber 238. The cross-section of the drive shoulder 262 and the passage 246 adjacent the front mating face 232 are substantially the same whereby the drive shoulder 262 will inhibit flow from the flow chamber 236. Access to the flow chamber 236 is afforded by a plug 266 threadably secured in a bore formed in the housing 228.

Preferably the housings 228 and 230 and the plug 266 are comprised of a polymeric material, such as glass filled nylon. To form a complementary transition between the polymeric material of the housing 228 and to transmit force, flat annular washers 268 and 270 are located between the mating face 232 and the diaphragm 248, the washer 268 being of polymeric material and abutted against, the mating face 232 and the washer 270 being of a suitable metal and abutted against the diaphragm.

Movement of the push rod 258 is controlled, in part, by a flat circular force plate 272 disposed in the chamber 238, an axial flow control plunger 274 extending through a wall of the housing 230 into the chamber 238 to engage the force plate 272, a flat polymeric annular washer 276 in the chamber 238 and abutted against the diaphragm 248, and a cylindrical coil spring 278. The coil spring 278 is comprised of flat coils and has its opposite axial ends abutted, respectively, against the annular washer 276 and the force plate 272. The forward end 264 of the push rod 258 is provided with a cap 280 which engages the washer 276, the cap 280 and the drive shoulder 262 operating to clamp the washers 268, 270 and 276 and the diaphragm 248 together. The flow control plunger 274 is threadably engaged with the housing 230 and adapted to be incrementally advanced into and outward of the chamber 238, the inward advance of the flow control plunger 274 increasing the spring force acting on the washer 276 (and thus the fluid pressure needed to overcome the spring load).

Figure 20:
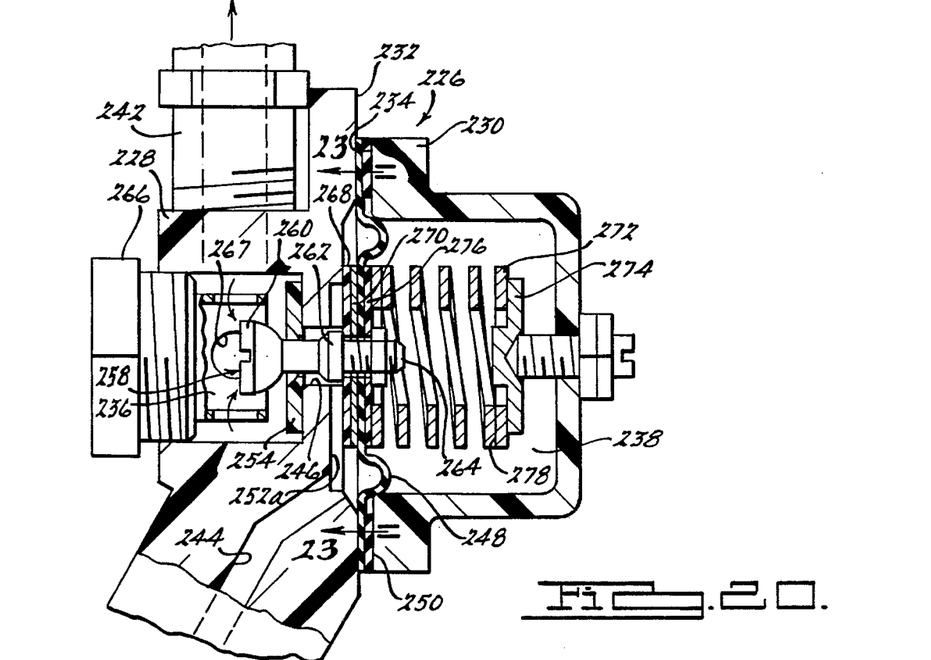
Figures 21, 22, 23:
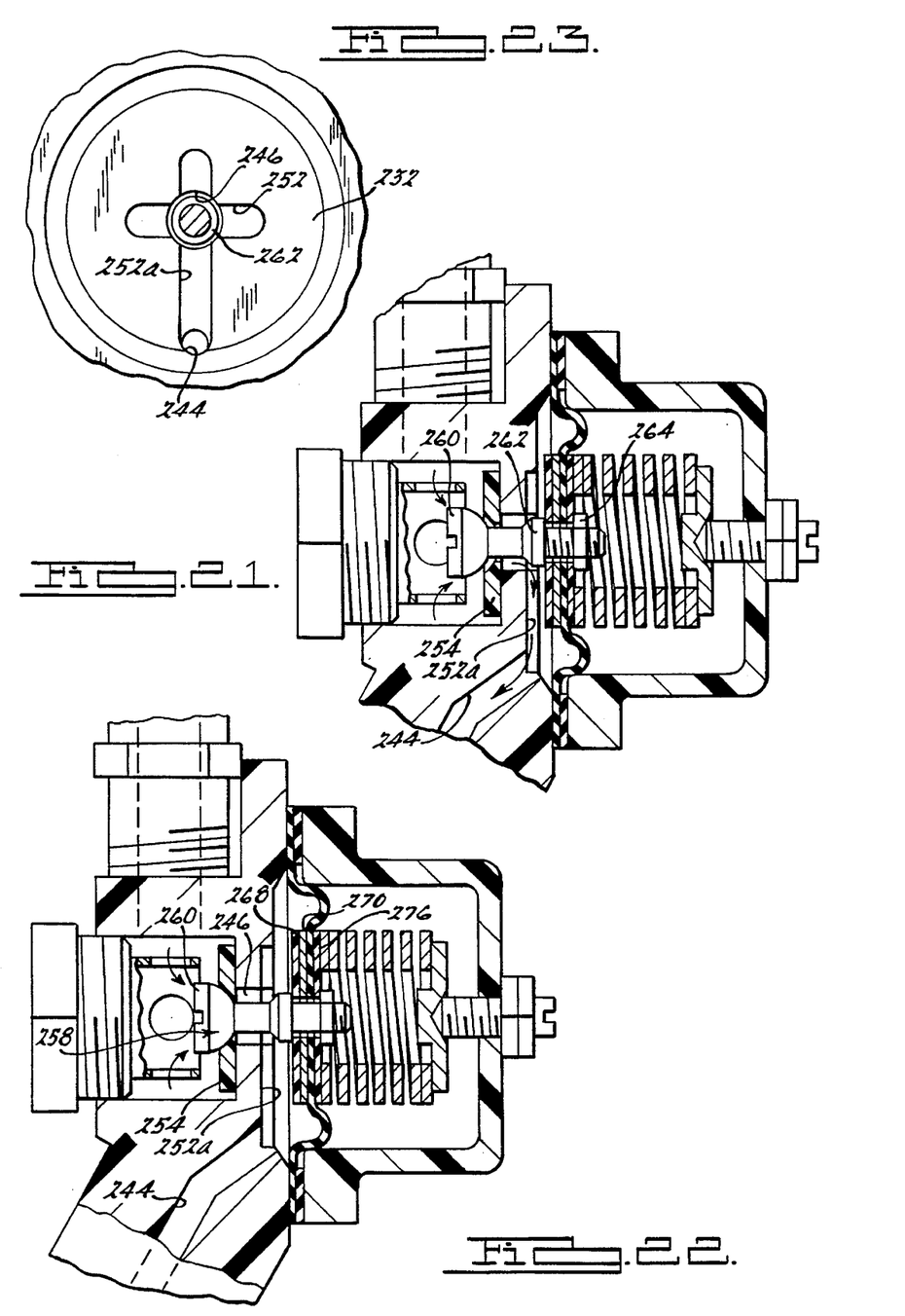

The operation of the flow regulator 226 is shown in sequence in FIGS. 20–22. Fluid flow is regulated through the flow regulator 226 by the axial reciprocation of the push rod 258 within the passage 246. During operation, the flow chamber 236 continuously receives and recirculates a high volume of liquid paint whereby to maintain the liquid constituents therein in the form of a substantially uniform dispersion. The paint is introduced into the flow chamber 236 through one sidewall of the flow chamber such that the paint will impinge on an apertured turbulizer sleeve 267 extending from the plug 266 and against an opposite sidewall to develop a swirling action to maintain the paint constituents uniformly dispersed.

Initially, as shown in FIG. 20, the coil spring 278 normally biases the polymeric washer 268 against the mating face 232, thereby resulting in the washer 268 forcing the drive shoulder 262 of the push rod 258 into position in closing relation with the outlet of the passage 246. Pressurized liquid is then introduced into the flow chamber 236 via the inlet line 240. If the fluid pressure is lower than the spring force, the drive shoulder 262 will not move but will act to prevent fluid from flowing through the passage 246. The fluid will return to the supply via the return line 242.

As shown in FIG. 21, as the fluid pressure increases, the force acting on the head 260 of the push rod 258 will exceed the spring force, thereby driving the drive shoulder 262 of the push rod towards the second housing 230 and the washer 268 from covering relation against the mating face 232 and with the recesses 252. Fluid is allowed to communicate via the recess 252a and to the outlet line 244. Excess fluid will return to the supply via the return line 242.

Finally, as shown in FIG. 22 should the pressure increase to a level that the fluid force acting on the head 260 is greater than the spring force, the head 260 will move into seated relation with the wall of the through bore 256 of the seal 254 mounted in the fluid chamber 236. In this condition, the push rod 258 will prevent fluid from passing through the passage 246 and the fluid will return to the supply via the return line 242.

Figure 24:
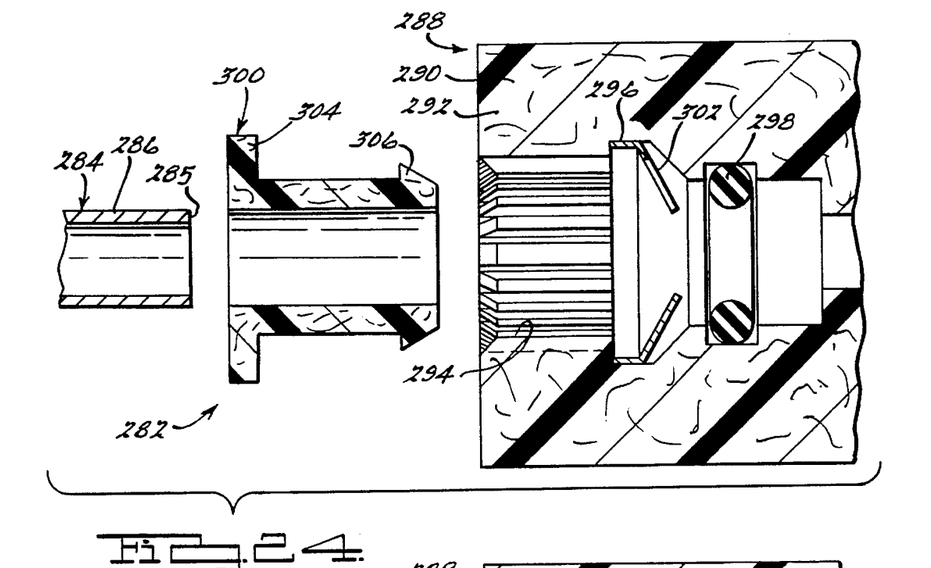
FIGS. 24–26 are views of a push to connect fluid coupling including a compression seal for a recirculating paint system according to this invention.
Figure 25:
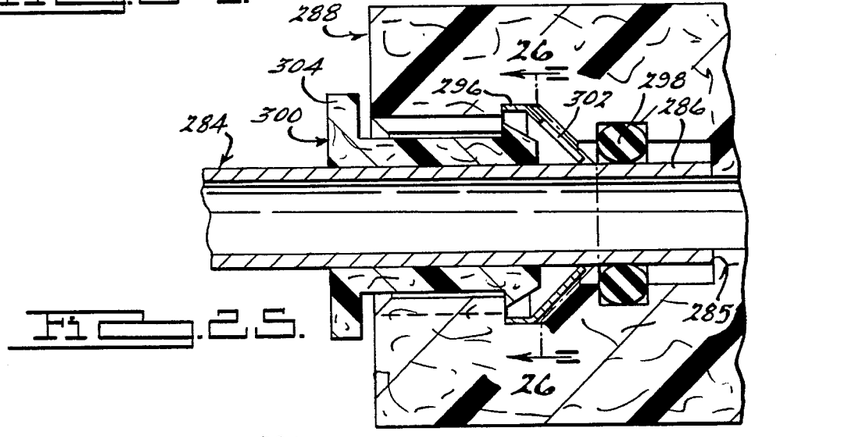
Figure 26:
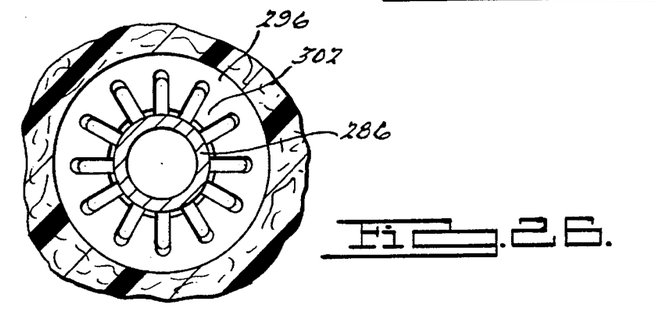

According to another feature of this invention, a push to connect fluid coupling 282 is shown in FIGS. 24–25. In this fluid coupling, a cylindrical fluid conduit 284 has an end portion 286 adapted to be inserted into a fluid connector 288, whereby to be simultaneously releasably gripped, axially positioned and sealed. As shown, the fluid connector 288 comprises a housing 290 having an annular shoulder 292 leading into a stepped bore 294, an annular lock ring 296 and an annular O-ring 298 located in the bore 294, and a tubular unlock sleeve 300 mounted to the shoulder. The lock ring 296 and the O-ring 298 are mounted in respective annular grooves formed in the stepped bore 294 and each operates to radially engage the outer periphery of the conduit 284 to inhibit its unwanted release. The lock ring 296 has a plurality of radially inwardly directed spring tines 302 which are adapted to engage the end portion 286 and lock the conduit 284 in the bore 294. The tines 302 deflect radially outwardly upon engagement with the fluid conduit 284 and direct the end portion 286 towards the O-ring 298 and the end 285 of the conduit towards an endwall of the bore 294. The unlock sleeve 300 includes a pair of axially spaced collars 304 and 306 which engage opposite axial faces of the annular shoulder 292, the collars being axially spaced to permit axial captivated movement of the unlock sleeve 300 relative to the housing 290.

To effectuate release, the unlock sleeve 300 is forced axially inwardly of the stepped bore 294 whereby the conical end face of the collar 306 engages and drives the spring tines 302 radially outwardly. The collar 304 prevents excess inward axial movement of the unlock sleeve 300 into the stepped bore, such movement as could overstress the spring tines 302, or possibly cause the collar 306 to be locked between the O-ring 298 and the deflectable ends of the tines 302. In this regard, the wall between the annular groove receiving the lock ring 296 and the O-ring 298 is tapered and serves to support the tines 302 during their deflection.

While the above description constitutes the preferred embodiment of the invention, it will be appreciated that the invention is susceptible to modification, variation, and change without departing from the proper scope or fair meaning of the accompanying claims.

What is claimed is:

1. In a recirculating paint supply system including a pressurized conduit having a first end and second end for receiving and supplying, respectively, a liquid coating composition to a spray nozzle in an amount in excess of that required and for returning the excess liquid coating composition to a supply tank, the improvement comprising:

flow preventing means, including a valve body fitted to the second end of said conduit, for preventing fluid flow from said conduit;

flow enabling means, extending from said spray nozzle and insertable in said valve body, for enabling the liquid coating composition to communicate to said nozzle, said flow enabling means including a stem; and connecting means for connecting said valve body to said spray nozzle, said flow preventing means being normally operable to prevent fluid from passing from said conduit to said spray nozzle when said valve body is disconnected from said spray nozzle and comprising a fluid seal means mounted in said valve body for assisting in sealing said valve body, said fluid seal means having a first end face opposite a second end face and a central passage extending between said end faces, said second end face forming a skirt which tapers inwardly, and a closure member normally forced into sealing engagement with the first end face of said fluid seal means and the central passage for preventing flow through said valve body, and said stem being operable to cause said skirt to expand outwardly to first establish sealing engagement with the second end face during axial insertion to inhibit flashback of the liquid coating composition before said stem engages and moves said closure member from engagement with said first end face of said fluid seal means, fluid flow being enabled substantially simultaneously with said closure member being forced from engagement with said first end face of said fluid seal means by said stem.

2. The recirculating paint supply system as claimed in claim 1 wherein said stem comprises a cylindrical stem having a semispherical end face adapted to engage and force said closure member from sealing engagement with the first end face of the fluid seal means, said stem having an inlet for receiving said liquid coating composition and at least one outlet for discharging said liquid coating composition.

3. The recirculating paint supply system as claimed in claim 1 wherein said valve body is comprised of a polymeric material.

4. The recirculating paint supply system as claimed in claim 3 wherein said polymeric material comprises glass filled nylon.

5. The recirculating paint supply system as claimed in claim 1 further comprising swivel means for allowing relative rotation between the valve body and the spray nozzle, flow restrictor means for adjusting the volume rate of flow from the valve body to the spray nozzle, and filter means for filtering the liquid coating composition passing between said valve body and said spray nozzle whereby to prevent particles in the liquid coating composition from reaching the spray nozzle.

6. The recirculating paint supply system as claimed in claim 1 further comprising swivel means, including a body portion comprised of a polymeric material, for allowing relative rotation between the conduit and the spray nozzle.

7. The recirculating paint supply system as claimed in claim 1 further comprising flow control means, including a body portion comprised of a polymeric material, for restricting and adjusting the rate of liquid coating composition passing between the conduit and the spray nozzle.

8. The recirculating paint supply system as claimed in claim 1 further comprising filter means, including a body portion comprised of a polymeric material, for filtering the liquid coating composition passing between the conduit and the spray nozzle.

9. A method of connecting and disconnecting a fluid conduit to a nozzle of a spray gun such that during connection and disconnection excess fluid does not escape from the conduit, the steps of the method comprising:

connecting a fluid fitting to said spray gun, said fluid fitting including a cylindrical stem having an outer periphery and a fluid passage;

connecting a valve body to a discharge end of said conduit, said valve body having a bore extending therethrough for passing said fluid to said fluid passage;

positioning an annular seal mechanism having a first end face opposite a second end face and being in sealed relation with a wall of said bore, said annular seal mechanism having a central passage extending between said first and second end faces thereof and a cross-section of said central passage being less than the cross-section of said outer periphery, said second end face forming a conical skirt;

biasing a closure member against the first end face to prevent fluid passage through said bore;

inserting the stem into the central passage through the second end face whereby the conical skirt expands outwardly as the outer periphery is brought into sealed engagement with the second end face before the stem engages the closure member to inhibit flashback of the fluid;

continuing the insertion of the stem until the stem engages the closure member;

forcing the closure member from engagement with the first end face to enable fluid flow through the fluid passage; and withdrawing the stem from the central passage whereby the closure member is brought into sealed engagement with the first end face before said outer periphery disengages the second end face to inhibit flashback of the fluid.

10. In a recirculating fluid supply system including a spray nozzle for discharging a fluid, conduit means, including a conduit having first and second end portions, for receiving from a supply and supplying the fluid to said spray nozzle in an amount in excess of that required and for returning to the supply the excess fluid not discharged from the spray nozzle, a first fluid connection means for fluidly connecting the first end portion of the conduit to the fluid supply, and a second fluid connection means for fluidly connecting the second end portion of the conduit to the spray nozzle, the improvement wherein said second fluid connection means comprises a first valve body fluidly connected to said spray nozzle, a second valve body having a fluid bore extending therethrough, said second valve body fluidly connected to said conduit taxi connectable to said first valve body, said second valve body including a seal means mounted in the bore for assisting in sealing said second valve body, said seal means having a first end face opposite a second end face and a fluid passage extending between the end faces, said second end face forming an inwardly tapered skirt, a closure member mounted in said fluid passage for movement between a first position to a second position, respectively, for preventing and permitting the fluid to pass through said fluid passage and said bore, said closure member being normally biased into sealing engagement with the first end face and in covering relation with the fluid passage opening thereon, and said first valve body including an elongated tubular stem which is adapted to be inserted into said fluid bore to progressively establish sealing engagement with the second end face as said skirt expands outwardly before said stem engages said closure member thereby inhibiting flow or flashback of fluid, with said stem thereafter engaging the closure member and moving the closure member from its first position in covering engagement with the seal means and into its second position spaced from the first end face to permit flow.

11. The recirculating fluid supply system as claimed in claim 10, wherein said conduit includes a supply passage and a return passage separated from the supply passage; and said first fluid connection means comprises:

a first valve means, including an inlet fluidly connected to said supply and an outlet fluidly connected to the first end portion of said conduit, for connecting the supply to said supply passage and communicating the fluid along a first path into the supply passage of the conduit;

a second valve means, including an inlet fluidly connected to the first end portion of said conduit and an outlet fluidly connected to said supply, for connecting the return passage to said supply and communicating the excess fluid from the spray nozzle along a second path different from said first path, and third valve means, including an inlet fluidly connected to the first path and an outlet fluidly connected to the second path and defining a third path between its inlet and outlet, for connecting the first path to the second path, said first, second and third valve means each being positionable in first and second positions with the first position permitting and the second position preventing flow between the inlet and outlet ends of the associated valve means, flow being prevented from reaching the conduit when the first and second valve means are in their second position and diverted therefrom when the third valve means is in its first position thereby enabling the conduit to be removed from the supply.

12. The recirculating fluid supply system as claimed in claim 11, wherein said first, second and third valve means are interconnected to form an H-shaped valve body.

13. The recirculating fluid supply system as claimed in claim 12, wherein said first fluid connection means further comprises a Y-shaped fluid connector body, said connector body having a first passage means having a first end connected to said first valve means and a second end connected to the supply passage, and a second passage means having a first end connected to said second valve means and a second end connected to the return passage.

14. The recirculating fluid supply system as claimed in claim 11, wherein said second fluid connection means further comprises a fluid fitting having helical convolutions and a forward end portion connectable to said second valve body; and strain relief means, associated with said helical convolutions, for connecting the fluid fitting to the second end portion of the conduit.

* * * * *